US007357898B2

(12) United States Patent
Samper et al.

(10) Patent No.: US 7,357,898 B2
(45) Date of Patent: Apr. 15, 2008

(54) MICROFLUIDICS PACKAGES AND METHODS OF USING SAME

(75) Inventors: Victor Samper, Springdale (SG); Lin Cong, Singapore (SG); Hongmiao Ji, Singapore (SG)

(73) Assignees: Agency for Science, Technology and Research, Singapore (SG); National University of Singapore, Crescent (SG)

( * ) Notice: Subject to any disclaimer, the term of this patent is extended or adjusted under 35 U.S.C. 154(b) by 609 days.

(21) Appl. No.: 10/631,478

(22) Filed: Jul. 31, 2003

(65) Prior Publication Data

US 2005/0026300 A1 Feb. 3, 2005

(51) Int. Cl.
*G01N 1/10* (2006.01)
*G01N 27/00* (2006.01)

(52) U.S. Cl. .................. 422/100; 422/82.01; 436/150; 436/180

(58) Field of Classification Search ............ 422/82.01, 422/100; 436/150, 180
See application file for complete search history.

(56) References Cited

U.S. PATENT DOCUMENTS 3,754,989 A * 8/1973 Bockstie, Jr. ............... 428/331
4,001,762 A * 1/1977 Aoki et al. ................. 338/309
4,541,035 A * 9/1985 Carlson et al. ............. 361/792
5,882,465 A * 3/1999 McReynolds ............... 156/285
6,068,751 A 5/2000 Neukermans ............... 204/601
6,082,185 A 7/2000 Saaski ....................... 73/64.56
6,443,179 B1 * 9/2002 Benavides et al. ....... 137/454.2
6,521,188 B1 * 2/2003 Webster ...................... 422/100
7,060,419 B2 * 6/2006 Bentsen et al. ............. 430/320
2002/0142482 A1 * 10/2002 Wu et al. .................... 436/177
2004/0241042 A1 * 12/2004 Pugia et al. .................. 422/58

FOREIGN PATENT DOCUMENTS

WO WO 02/18827 3/2002

* cited by examiner

*Primary Examiner*—Jill Warden
*Assistant Examiner*—Paul S Hyun
(74) *Attorney, Agent, or Firm*—Connolly Bove Lodge & Hutz, LLP

(57) ABSTRACT

Microfluidics packages and methods of use are described, comprising in one embodiment a substrate having a top surface and means to lower pressure on the top surface; a fluidics card having a bottom surface and means to allow fluids to traverse through the card; and a polymeric barrier film, the polymeric barrier film positioned between the top surface of the substrate and the bottom surface of the fluidics card.

18 Claims, 6 Drawing Sheets

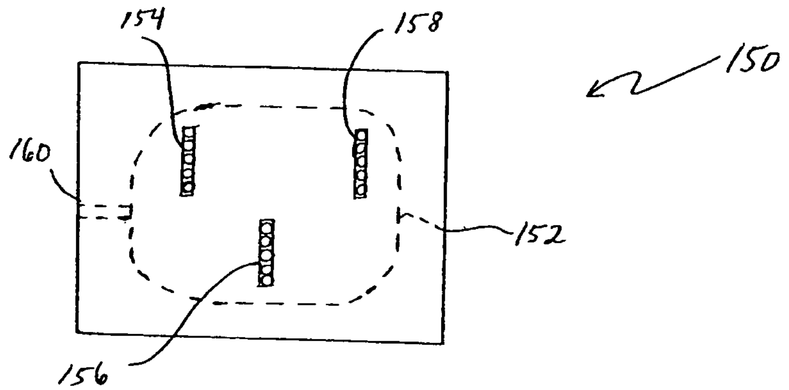
FIG. 9
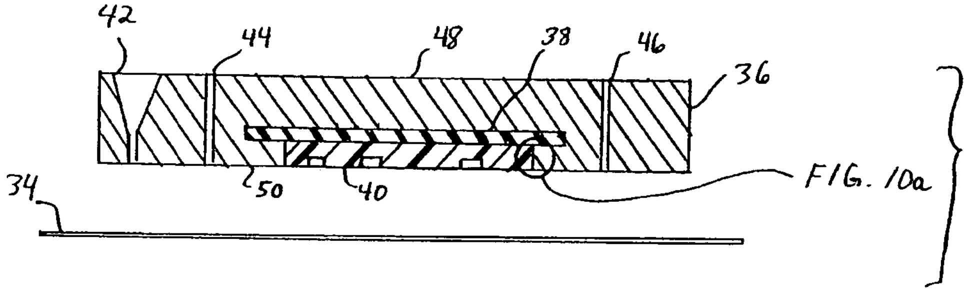
FIG. 10
FIG. 10a
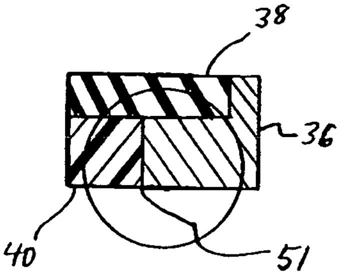

MICROFLUIDICS PACKAGES AND METHODS OF USING SAME

BACKGROUND INFORMATION

1. Technical Field

The invention is generally related to the field of microfluidics and, more specifically, to microfluidics packages.

2. Background Art

Currently the interface between the macroscopic ("real") world and the microfluidics world is one of the major obstacles in the practical use of lab-on-a-chip components. There are several problems associated with passing microfluidics samples from the "real" world to a microfluidics device, including sample contamination of associated instrumentation, the desire to decrease dead volume in such devices, and a desire to precisely control the volume of sample required. These problems can be understood by considering the example of handling a blood sample. In most respects it is undesirable that the blood, or any related biological product, can diffuse or otherwise contaminate the instrumentation (pumps, valves, tubes and the like). If contamination occurs, the instrumentation must be cleaned before it can be used for a new sample. "Dead volume" refers to the fluid sample being trapped in connecting tubes, channels or valves associated with the system. In some cases, the amount of available blood or fluid to be tested is limited, making it therefore desirable to keep the dead volume as small as possible.

A conventional method for microfluidics packaging may be illustrated by FIG. 1. FIG. 1 illustrates a package 1 comprising a printed circuit board 2, a microfluidics chip 4 having a series of fluid flow channels 3, a gasket material 6 also comprising a series of fluid flow channels 5, and a microfluidics substrate 8. Substrate 8 comprises fluid inlet channels 10 and 12 and a fluid outlet channel 14. Typically fluid inlets 10 and 12 and fluid outlet 14 are connected to pumps, valves, and the like through tubes or other means. It is clear that the whole package 1 will be contaminated as the fluid product flows through. Dead volume cannot be minimized since tubes are used for connections. In addition, volume control depends on precise external pump control, which is inconvenient.

U.S. Pat. No. 6,082,185 describes a compact fluid circuit card having a main body with internal sensing elements and with fluidic circuit components located on both its front and back surfaces. The cards are described as being made inexpensive enough to be disposable by forming its main body and all of its fluidic circuit components so that they are suitable for being integrally formed in one piece by injection molding from plastic, and by using thin strips of adhesively attached material for the main cover bodies, and valve membrane strip. The patent describes the use of heat shrinkable plastic as one suitable valve membrane material. While the patent does describe prevention of cross contamination between liquids in the card by using plastic valve membranes, there is no provision for preventing contamination of clean areas of instrumentation. Moreover, the patent does not describe packaging of microfluidics systems.

Patent Cooperation Treaty International Publication No. WO 02/18827 A1, published Mar. 7, 2002, describes microfluidics valves which include a microconduit for carrying fluid therethrough and at least one microactuating mechanism for selectively deflecting at least a portion of a wall of the microconduit, thus occluding fluid flow through the microconduit. This publication describes a microfluidics valve that is opened or closed by heating and expanding a flexible material to open and close the microfluidics channels. The flexible material may be selected from materials including, but not limited to, "silicon rubber, natural rubber, polyurethane, PVC, polymers and any other similar flexible mechanism known to those of skill in the art." This document does not disclose or suggest microfluidics packages or microfluidics chips as those terms are used herein.

U.S. Pat. No. 6,443,179 describes another method for electro-microfluidics systems packaging. The patent describes "a new architecture" relying on two scales of packaging to bring fluid to the device scale (picoliters) from the macro-scale (microliters). The larger package consists of a circuit board with embedded fluidic channels and standard fluidic connectors (referred to as a fluidic printed wiring board). The embedded channels connect to the smaller package, referred to as an electromicrofluidics dual-inline-package (EMDIP) that takes fluid to the microfluidics integrated circuit (MIC). The fluid connection is made to the back of the MIC through etched holes that take fluid to surface micromachined channels on the front of the MIC. Provision is also made for electrical connections to bond pads on the front of the MIC. The patent does describe packaged electro-microfluidics devices, for example in FIGS. 22 and 23 where the packaged electro-microfluidics devices are mounted on fluidic printed circuit boards. Adhesive layers are used to bond different components together. Also described are methods of packaging electro-microfluidics devices such as illustrated in FIG. 26. However in all embodiments described in this patent, fluidic passageways through the adhesive layers do not address the contamination issues resolved in the present invention. Nor does the patent address dead volume issues or small quantity sample issues. Essentially the adhesive films function as gasket materials.

U.S. Pat. No. 6,068,751 describes a microfluidics delivery system that allows control of flow of a fluid through elongated capillaries that are enclosed along at least one surface by a layer of a malleable material. An electrically powered actuator included in the system extends toward or retracts a blade from the layer of malleable material to either occlude or open capillaries. Reservoirs included in the pouch together with the capillaries supply fluids whose flow is controlled by movement of the blades. This patent does describe a microfluidics system in which an actuator portion of a valve does not become contaminated during system operation and in fact the actuator portion of the valves are reusable without cleaning. However, the microfluidics delivery systems of this particular patent require electromechanical valves to stop and start flows of fluids, with components that are irregularly shaped, and do not employ barrier films.

SUMMARY OF THE INVENTION

The microfluidics packages and methods of the present invention reduce or overcome many deficiencies of the prior art. In addition, specific embodiments may be made reusable. As used herein "reusable" means that fluid samples that are considered contaminated do not touch critical system components, therefore the system components do not have to be cleaned for reuse. Moreover, embodiments of the invention significantly reduce dead volume, and afford extremely precise volume control.

In accordance with an embodiment of the present invention, a microfluidics package comprises:

a) a substrate having a patterned top surface;

b) a fluidics card having a top surface, a bottom surface, at least one side surface, and passages to allow fluids to traverse from either the top surface or any side surface to the bottom surface of the fluidics card; and c) a polymeric barrier film positioned between the top surface of the substrate and the bottom surface of the fluidics card.

Microfluidics packages of the invention are those wherein the means to lower pressure comprises a plurality of vacuum pores traversing from the top surface of the substrate to a source of vacuum, which may include a chamber located within the substrate. The patterned top surface of the substrate comprises one or more fluid flow channels, and the fluidics card may have a programmable chip having one or more fluid flow channels, the chip being electronically connected to a printed circuit board (PCB) or other electronic communication means. The chip, the PCB, and the card may form a joint that is hermetic, meaning that fluids cannot permeate there between. The passages in the fluidics card may comprise a sample reservoir, at least one fluid inlet, and at least one fluid outlet. The sample reservoir and the fluid inlet are fluidly connected to a first fluid flow channel on the patterned top surface of the substrate and the fluid outlet is fluidly connected to a second fluid flow channel on the top surface of the substrate. The polymeric barrier film comprises a polymer selected from the group consisting of elastic polymers and thermoplastic polymers, such as thermoplastic elastomers. The polymeric barrier film can have higher heat conductivity than the substrate material, allowing heat to be carried away from or delivered to the flow channels. A cover plate may be attached to the top surface of the card, which functions to prevent contamination of the sample, and a second barrier film may be positioned between the cover plate and the sample reservoir.

Another embodiment of the invention is a method comprising the steps of:

a) selecting a fluidics card, the fluidics card comprising a reagent inlet passage, an outlet passage, a fluidics chip, and a PCB;

b) selecting a substrate, the substrate having a top surface;

c) selecting a first polymeric barrier film compatible with a fluid sample;

d) placing the polymeric barrier film over and in contact with the substrate and the fluidics card; and e) loading the fluid sample, the loading being either to the first polymeric barrier film prior to assembling the fluidics card and substrate, or to the reservoir after assembling the fluidics card and substrate.

This embodiment may also comprise evacuating a space between the polymeric barrier film and the substrate after step (d) and before step (e), thereby drawing the first polymeric barrier film against the top surface of the substrate. By contacting the fluid sample with the analyzer chip, one or more sample properties may be analyzed.

Further aspects and advantages of the invention will become apparent by reviewing the description of embodiments that follows.

BRIEF DESCRIPTION OF THE DRAWING

For a more complete understanding of the present invention, and the advantages thereof, reference is now made to the following descriptions taken in conjunction with the accompanying drawings, which are representative illustrations and not necessarily to scale, and in which:

FIG. 9 is a plan view, with some parts shown in phantom, of a substrate useful in an embodiment of the present invention;

FIG. 10 is a cross-sectional view of a microfluidics card of an embodiment of the invention;

FIG. 10*a* illustrates an enlarged view of a portion of the microfluidics card of FIG. 10.

DETAILED DESCRIPTION

Figure 1:
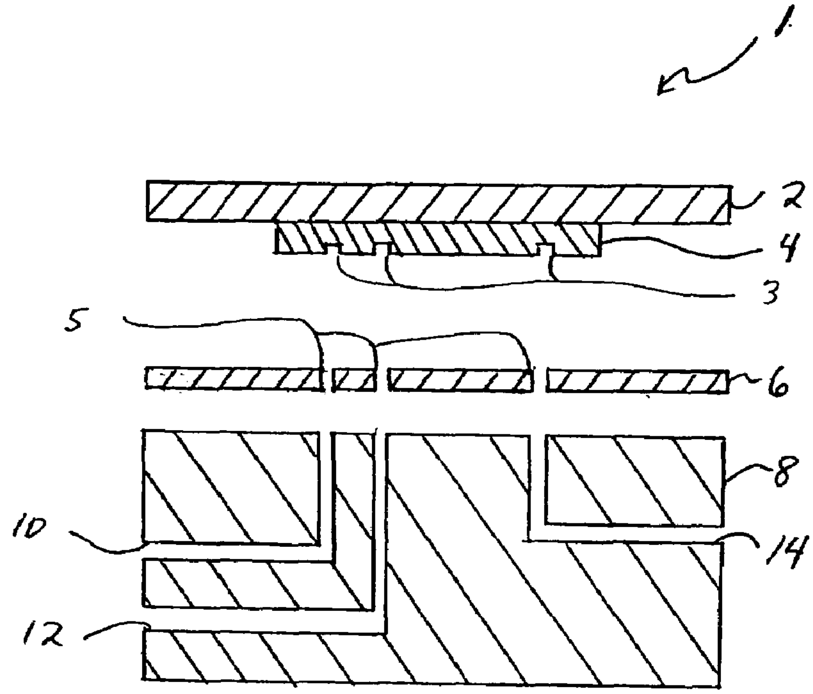
Fig. 1 (Prior Art)
FIG. 1 is a schematic cross-section view of a prior art microfluidics device.

The microfluidics packages and methods of the present invention utilize a thin polymeric barrier film over a patterned part. As used herein the term "patterned" includes, but is not limited to, machined parts and parts having patterns created by other methods, for example printing, embossing etching, and the like.

In the context of a microfluidics packaging, the invention uses the concept of forming a polymeric barrier film. By retaining the polymeric barrier film against a patterned substrate with a vacuum, the fluid flow channels of the substrate are thus lined with a polymeric barrier film. All the "clean" reagents can be pumped into the chip through inlets on a cover plate. The reservoir on the card is employed to hold "dirty" reagents (for example, blood or other biological samples), which may contaminate the instrument, and to provide precise volume control. By injecting air or applying hydraulic pressure over the reservoir, the sample in the reservoir can be deployed into the chip through the channels on the substrate. The polymeric barrier film functions as a barrier between the dirty parts (chips) and the clean parts (patterned substrate). The use of polymeric barrier films in accordance with the present invention will prevent contamination of instrumentation and therefore allow the apparatus of the invention to be reusable. Use of the polymeric barrier films in this fashion will also serve as sealing gaskets between the analyzer chip and the interconnects to the external world, thus no additional gasket material is required for sealing. In addition, by applying positive and negative pressure, the polymeric barrier films may form valves as herein described. The small channels on the substrate lead to small dead volume as compared to interconnecting tubing from conventional off-chip reservoirs, which is of great importance when only a tiny amount of test sample is available.

Embodiments of the invention may utilize a thin polymer film comprised of polymeric materials such as, but not restricted to polyurethane, epoxy and polycarbonate. The polymeric barrier films can undergo both elastic and/or plastic deformation. The polymeric barrier film conformity to patterned surfaces is achieved through a differential pressure across the film's two surfaces. This may be achieved by reducing pressure on the side of the film facing the patterned surface and contact with the fluids. The reduced pressure may be achieved through small holes or pores in the substrate, referred to as vacuum channels in reference to the figures. Many holes or pores can be connected together to reduce the number of external low-pressure connections. The hole or pore size is small enough to have minimal polymeric barrier film deformation into the holes. Typically, the polymeric barrier film deformation over the low-pressure connection holes or pores is less than 10% of its overall conformity into the substrate channels. The polymeric barrier film is chosen for its compatibility with the chosen application. For example, in the case of nucleic acid sample preparation and polymerase chain reaction (PCR) amplification one suitable polymeric barrier film material is polyurethane. The film thickness may range from about 5 micrometers to about 100 micrometers. The channels patterned on the substrate may range from about 100 micrometers to about 1 millimeter wide. The depth of the channels may range from about 10 micrometers to about 1 millimeter. The cover material and the substrate may be composed of any material including but not restricted to metal, polymer, glass, silicon, or ceramic. The cover material and the substrate material may be the same or different, although they may have the same or similar thermal coefficients of expansion. The microfluidics chip is enclosed in the card (see FIG. 3). If electrical connections to the chip are necessary, the chip can be attached to a PCB before enclosing the chip in the card. The method of enclosing the microfluidics chip and the PCB (if present) is not critical to the invention. The enclosure should result in a continuous flat surface in contact with the polymeric barrier film as illustrated in FIGS. 10 and 10*a*. Conventional processes such as casting or injection molding can achieve this. The materials for the card can be, but are not restricted to, polydimethyl siloxane (PDMS), polycarbonate, and polypropylene. The polymeric barrier films also serve as gasket material and can form pumps and/or valves if required by modification of the differential pressure across its surfaces.

Figure 2:
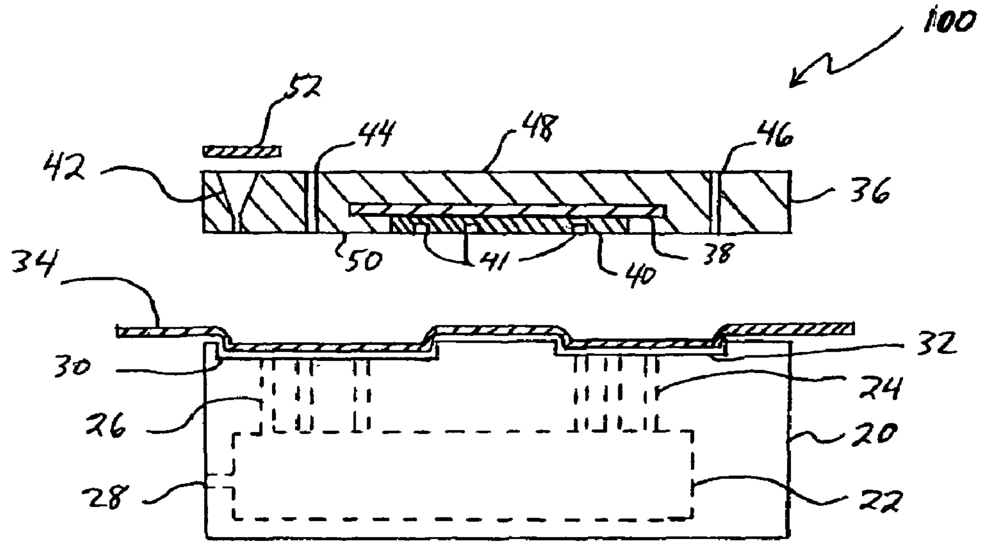
FIG. 2 is a schematic cross-section view of a microfluidics package in accordance with an embodiment of the present invention.

Referring now to the drawing figures, FIG. 2 illustrates an embodiment 100 comprising a substrate 20 having a vacuum chamber 22 and a plurality of vacuum connections 24 and 26 connecting vacuum chamber 22 to a top surface of the substrate. Also illustrated is a connection 28 allowing vacuum to be drawn by a vacuum pump or other vacuum producing means (not illustrated). Embodiment 100 illustrates two fluid flow channels 30 and 32 on the top surface of substrate 20. A polymeric barrier film 34 is depicted as conforming to fluid flow channels 30 and 32. It should be noted that barrier film 34 would actually be touching channels 30 and 32 during operation of the device 100 due to a vacuum produced through vacuum connections 24 and 26. A fluidics card 36 is depicted having a means 38 to communicate with the outside world, such as a printed circuit board, and a programmable chip 40 having one or more fluid flow channels 41. Fluidics card 36 also comprises passages to allow fluids to traverse through the card, one such passage comprising a sample reservoir 42. Fluidics card 36 also comprises an inlet passage 44 and an outlet passage 46. As used herein the term "passage" includes, but is not limited to, smooth bore throughholes, tortuous paths, and the like. Typically a sample to be analyzed would be placed in reservoir 42 and a fluid reagent would be caused to flow through inlet 44 and the combined mixture caused to exit through fluid outlet 46. Passages 44 and 46 traverse completely through fluidics card 36 from a top surface thereof, 48, to a bottom surface thereof 50. Finally, a second polymeric barrier film 52 is provided, covering the reservoir 42 top surface.

Figure 3:
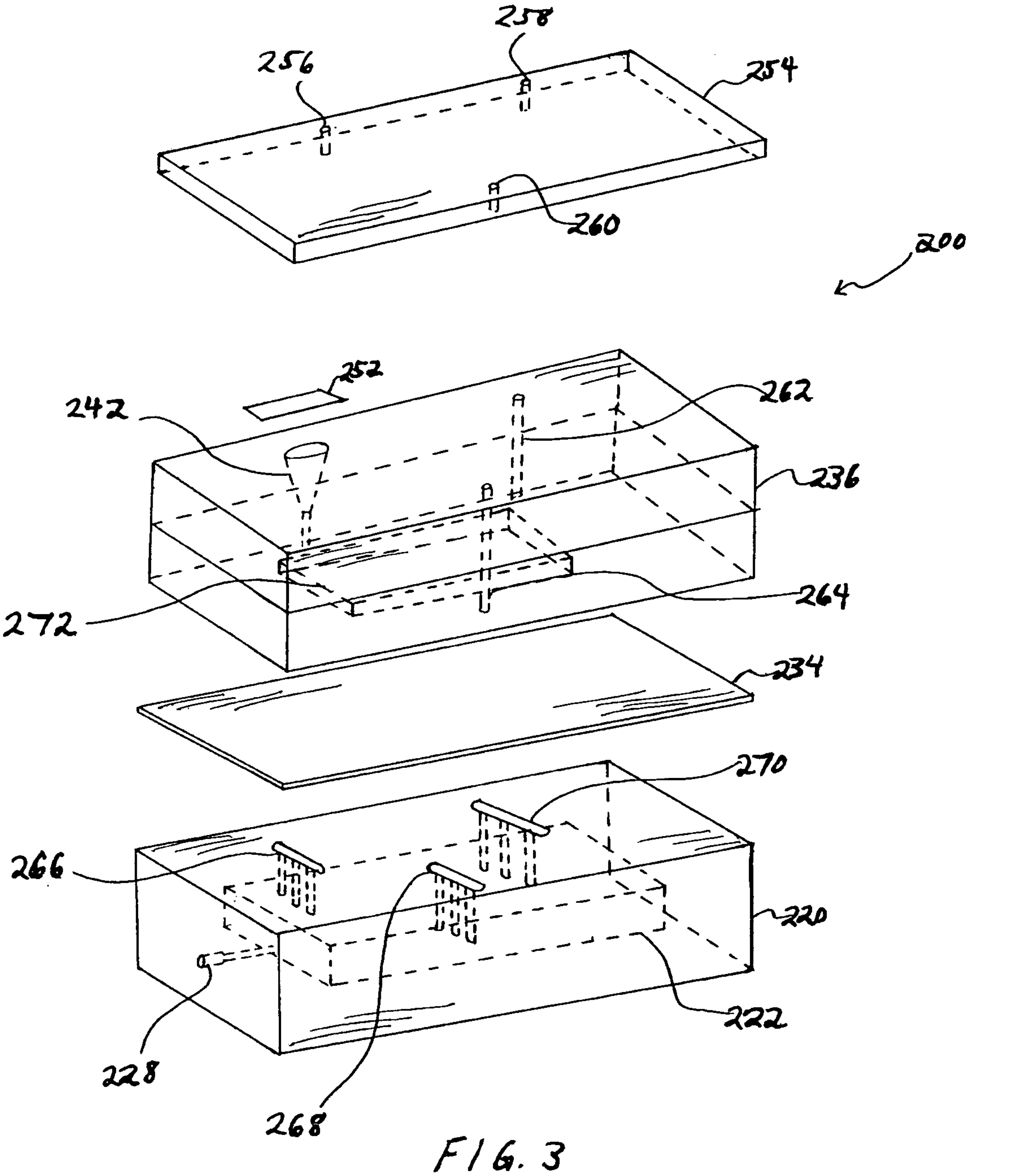
FIG. 3 illustrates an exploded perspective view of a microfluidics package in accordance with an embodiment of the present invention.

FIG. 3 illustrates an exploded perspective view of a microfluidics package 200 in accordance with the present invention. Microfluidics package 200 comprises a substrate 220, vacuum chamber 222 illustrated in phantom, and three vacuum connections 266, 268, and 270. Vacuum connections 266, 268 and 270 reduce pressure on a top surface of substrate 220 by allowing a vacuum source (not illustrated) to exert a vacuum. A vacuum source connection 228 leads to the source of vacuum. A polymeric barrier film 234 is depicted which is placed between fluidics card 236 and substrate 220. Fluid reservoir 242 is depicted as a conical shape, while any shape such as square, trapezoid, or conical section would be suitable. Inlet passage 264 and outlet passage 262 are depicted in phantom, while a second polymeric barrier film 252 is illustrated as adapted to be placed between reservoir 242 and a cover plate 254. Cover plate 254, which may or may not be necessary depending on the situation to reduce or eliminate contaminants from the atmosphere entering the sample, or portions of the sample escaping into the surroundings, includes passages 256, 258 and 260.

Figure 4:
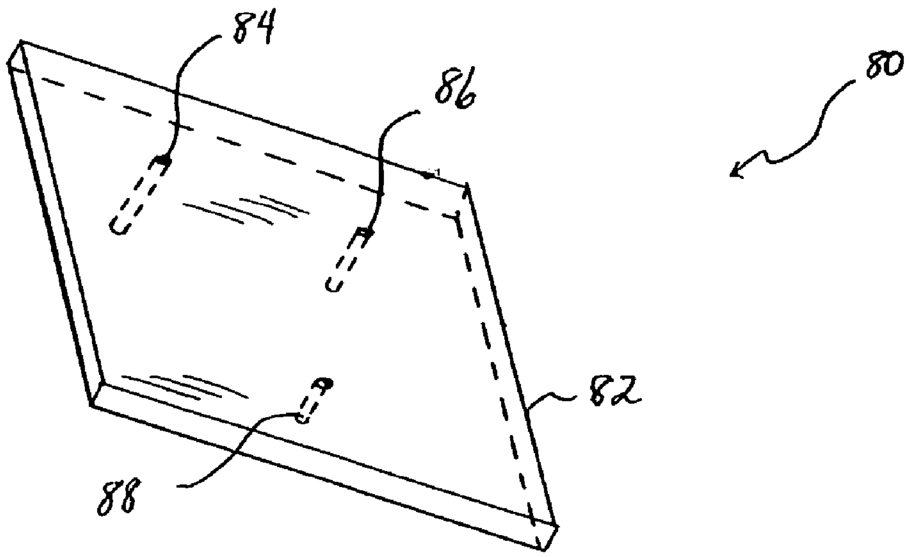
FIG. 4 illustrates a perspective view of a coverplate useful in a microfluidics package an embodiment of of the present invention.
Figure 5:
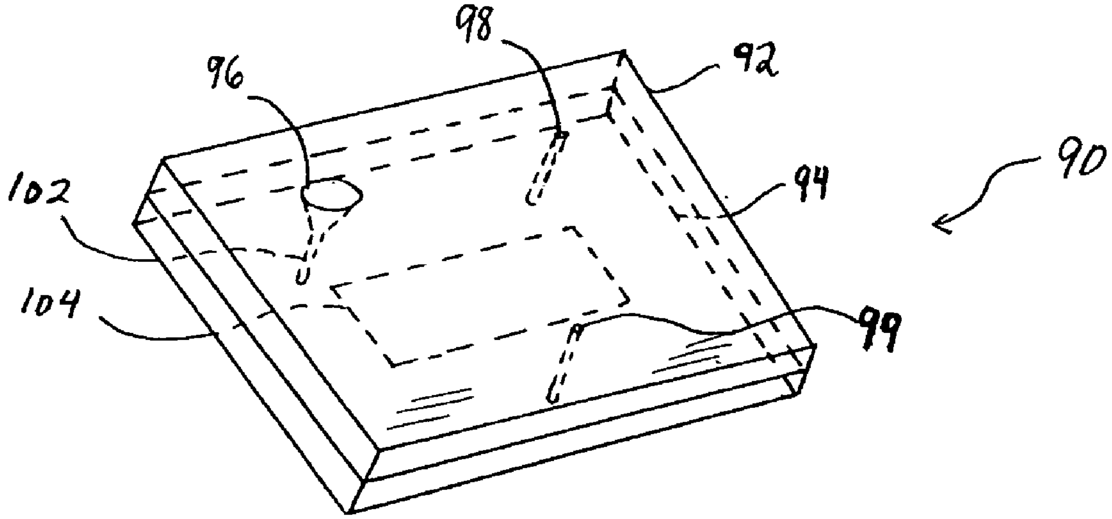
FIG. 5 illustrates a perspective view of a microfluidics card useful in an embodiment of the present invention with some parts illustrated in phantom.

FIG. 4 illustrates a perspective view of a cover plate 80, similar to the cover plate 254 of FIG. 3, useful in a microfluidics package of the present invention. Cover plate 80 comprises a solid plate 82 having passages 84, 86 and 88. Passage 84 leads to a sample reservoir in the microfluidics card as depicted in FIG. 5, at 96. Similarly, passage 88 is aligned with passage 99 in fluidics card 90 of FIG. 5 while passage 86 of FIG. 4 is aligned with outlet passage 98 as depicted in FIG. 5.

Figure 6:
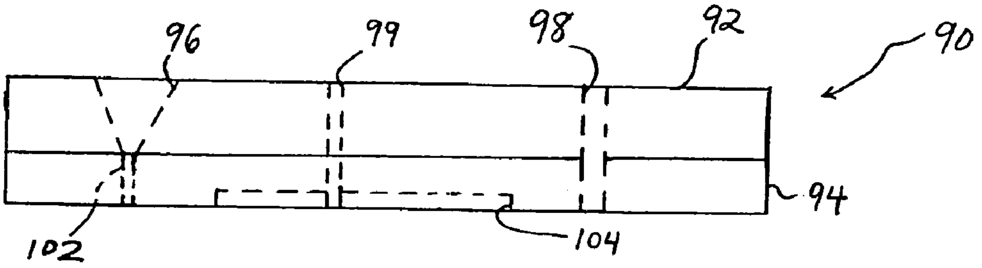
FIG. 6 is a side elevation view of the microfluidics card of FIG. 5 with some components shown in phantom.

FIGS. 5 and 6 illustrate perspective and side elevation views, respectively, of a microfluidics card 90 useful in the present invention with some parts illustrated in phantom. Microfluidics cards serve to route fluids to channels formed in a fluidics chip, as explained previously with reference to FIG. 2. Sample reservoir 96, inlet passage 99 and outlet passage 98 are depicted as explained in reference to FIG. 4. Fluidics card 90 is represented as essentially two members (although this is not required), a top member 92 and a bottom member 94. Sample reservoir 96 is fluidly connected to a passage through bottom member 94, designated at 102. Finally, a phantom dotted line 104 represents a position of a PCB and chip in bottom member 94.

Figure 7:
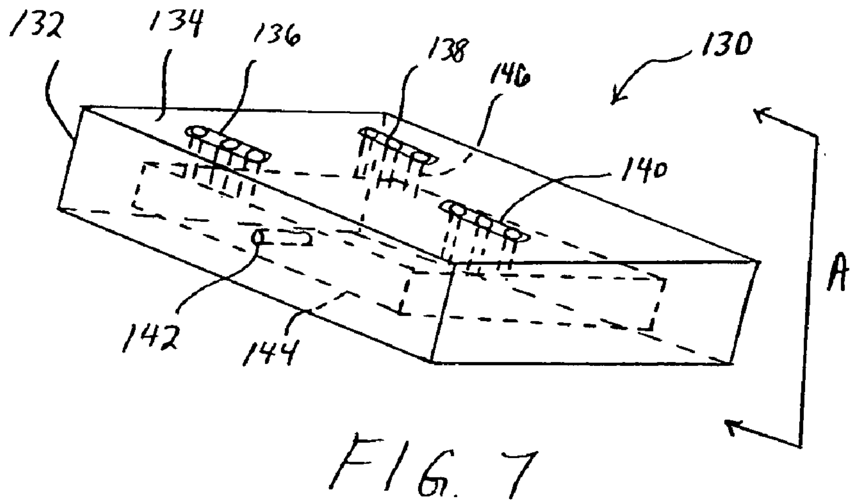
FIG. 7 is a perspective illustration of a substrate useful in an embodiment of the invention, depicting some components in phantom.
Figure 8:
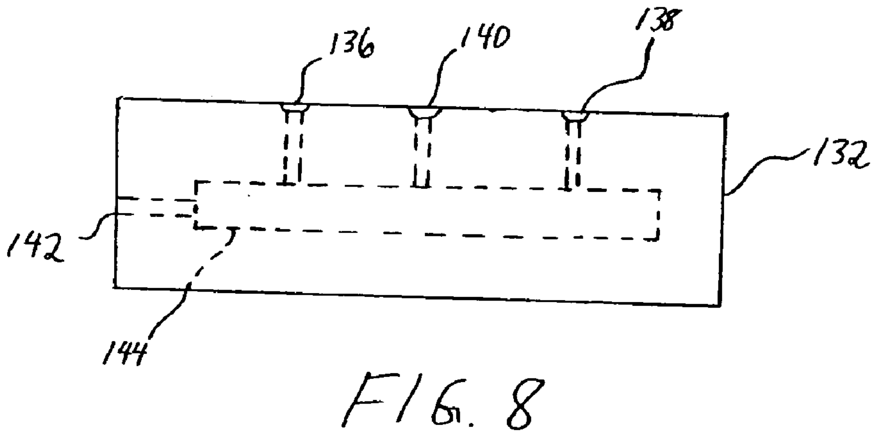
FIG. 8 is a side elevation view taken from the view "A" in FIG. 7, with vacuum channels and vacuum chamber illustrated in phantom.

FIGS. 7 and 8 are perspective and side elevation views, respectively, of a substrate 130 useful in the invention, depicting some components in phantom. Substrate is a "clean" portion of an inventive microfluidics package of the invention, as discussed in reference to FIG. 2, whereas the microfluidics card of FIGS. 5 and 6 is "contaminated" with sample fluid. Embodiment 130 comprises a substrate body 132 having a top surface 134 and vacuum connections 136, 138, and 140 all connected to a vacuum chamber 144 having a connection 142 to a vacuum source (not illustrated). A plurality of vacuum pores 146 are illustrated connecting vacuum connections 136, 138 and 140 to vacuum chamber 144. FIG. 8 is a side elevation view of the substrate 130 of FIG. 7 from view "A", illustrating some components in phantom. It should be emphasized regarding FIGS. 7 and 8 that vacuum chamber 144 may be any shape rather than rectangular as depicted in FIGS. 7 and 8. For example, FIG. 9 is a plan view, with some parts shown in phantom, of a substrate 150 useful in the present invention. Substrate 150 includes an irregularly shaped vacuum chamber 152, and three vacuum connections 154, 156, and 158. Finally, a vacuum source connection 160 is provided, connecting vacuum chamber 152 to an outside source of vacuum (not illustrated).

FIGS. 10 and 10*a* illustrate a feature for precise operation of apparatus of the invention. FIG. 10 essentially repeats the sectional view of the microfluidics card 100 of FIG. 2, while FIG. 10*a* illustrates an enlarged view of a portion of the microfluidics card 100 of FIG. 10. As illustrated in FIG. 10*a*, PCB 38, microfluidics chip 40, and fluidics card material 36 form a hermetic seal along with polymeric film 34 at the mechanical junction of the three components, depicted at 51. This junction is important to force fluids from channel 41 (see FIG. 2) into outlet passage 46. If this were not the case, sample fluids and reagents could leak through directly to PCB 38 and possibly cause erroneous readings, or short circuit the device.

Figure 11:
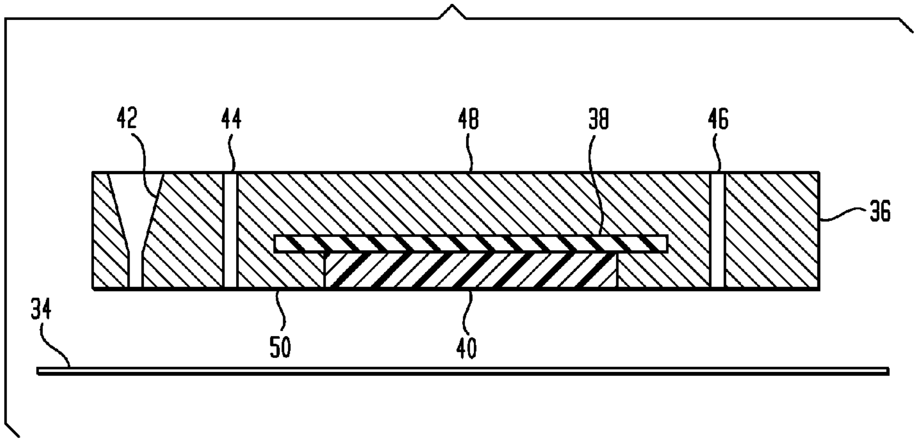
FIG. 11 is a cross-sectional view of a microfluidics card of an embodiment of the invention.

In one embodiment, the fluidics chip comprises a plan piece of silicon or glass without openings and channels, an example of which is illustrated in FIG. 11.

Although the foregoing examples and description are intended to be representative of the invention, they are not intended to in any way limit the scope of the appended claims.

What is claimed is:

1. A microfluidics package comprising:

a substrate comprising a patterned top surface having one or more fluid flow channels, a plurality of pores each configured to connect the patterned top surface of the substrate to a vacuum chamber located within the substrate, wherein the vacuum chamber is configured to be connected to a source of vacuum;

a fluidics card having a top surface, a bottom surface, at least one side surface, and one or more passages to allow fluids to traverse from the top surface or any of the one or more side surface to the bottom surface of the card; and a polymeric barrier film positioned between the patterned top surface of the substrate and the bottom surface of the fluidics card, wherein the polymeric barrier film conforms to the patterned top surface of the substrate so as to line the one or more fluid flow channels of the patterned top surface of the substrate.

2. The microfluidics package of claim 1 wherein the plurality of pores allow pressure between the patterned top surface of the substrate and the polymeric barrier film to be lowered by the source of vacuum.

3. The microfluidics package of claim 1 wherein the fluidics card comprises a fluidics chip.

4. The microfluidics package of claim 3 wherein the fluidics chip comprises one or more fluid flow channels.

5. The microfluidics package of claim 3 wherein the fluidics chip comprises a plain piece of silicon or glass without openings and channels.

6. The microfluidics package of claim 3 wherein the fluidics chip is electronically connected to a printed circuit board.

7. The microfluidics package of claim 6 wherein the fluidics chip, the printed circuit board, and the card form a joint which is hermetically sealed.

8. The microfluidics package of claim 1 wherein the passages comprise a sample reservoir, at least one fluid inlet, and at least one fluid outlet.

9. The microfluidics package of claim 8 wherein the sample reservoir and the fluid inlet are fluidly connected to a first fluid flow channel of the one or more lined fluid flow channels on the patterned top surface of the substrate, and the fluid outlet is fluidly connected to a second fluid flow channel of the one or more lined fluid flow channels on the patterned top surface of the substrate.

10. The microfluidics package of claim 1 wherein the polymeric barrier film comprises a polymer selected from the group consisting of elastic polymers and thermoplastic polymers.

11. The microfluidics package of claim 10 wherein the polymer has a higher heat conductivity than the substrate.

12. The microfluidics package of claim 8 comprising a cover plate attached to the top surface of the fluidics card.

13. The microfluidics package of claim 12 wherein a second barrier film is positioned between the cover plate and the sample reservoir.

14. The microfluidics package of claim 10 wherein the thermoplastic polymer is selected from the group consisting of carbon chain polymers and heterochain polymers.

15. A method comprising:

selecting a fluidics card comprising a sample reservoir, a reagent inlet passage, an outlet passage, a fluidics chip, and a printed circuit board;

selecting a substrate having a top surface having one or more fluid flow channels, a vacuum chamber, and a plurality of pores connecting the patterned top surface of the substrate to the vacuum chamber, wherein the vacuum chamber is configured to be connected to a source of vacuum;

selecting a first polymeric barrier film compatible with a fluid sample;

placing the first polymeric barrier film over and in contact with the top surface of the substrate;

reducing pressure between the top surface of the substrate and the first polymeric barrier film so as to force the first polymeric barrier film to conform to the top surface of the substrate thereby lining the one or more fluid flow channels on the top surface of the substrate; and loading the fluid sample either to the first polymeric barrier film prior to assembling the fluidics card and substrate, or to the reservoir after assembling the fluidics card and substrate.

16. The method of claim 15 wherein the first polymeric barrier film is selected from the group consisting of elastic polymers and thermoplastic polymers.

17. The method of claim 15 wherein the fluidics chip, the fluidics card, and the printed circuit board have thermal coefficients of expansion similar to each other.

18. The method of claim 15 further comprising:

placing a second polymeric barrier film over at least the sample reservoir; and placing a cover plate over the second polymeric barrier film.

* * * * *